Dec. 14, 1965 O. H. BANKER 3,223,122
SELECTOR VALVE
Filed Aug. 21, 1963
FIG. 4.
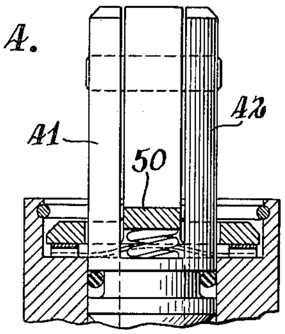
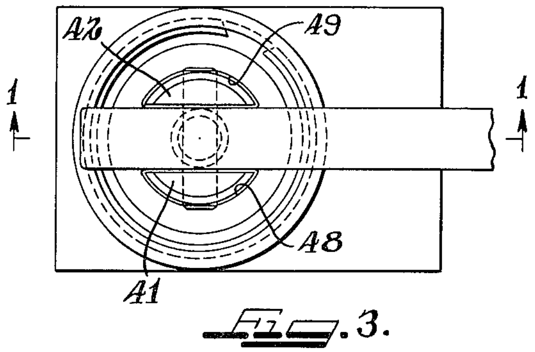
FIG. 3.
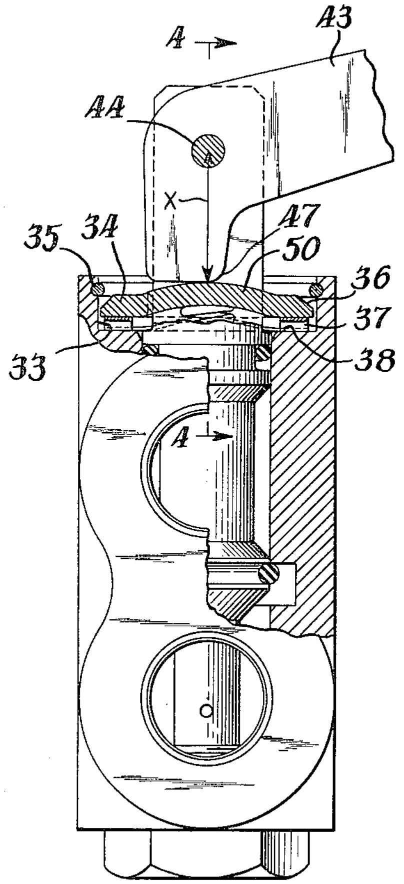
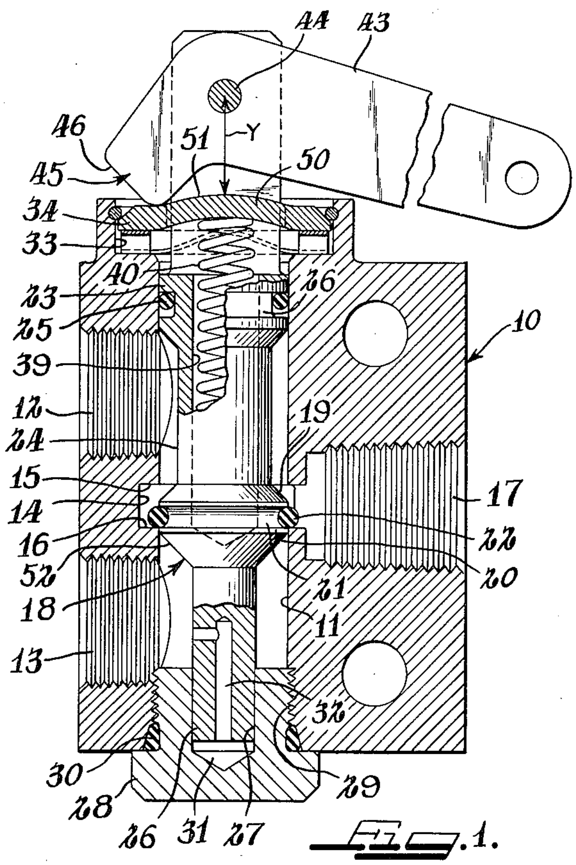
FIG. 1.
FIG. 2.
INVENTOR.
OSCAR H. BANKER
BY
Charles F. Voytech
Atty.

United States Patent Office 3,223,122
Patented Dec. 14, 1965

3,223,122
SELECTOR VALVE
Oscar H. Banker, % Bay Products Development Co., P.O. Box 9732, Bay Village, Ohio
Filed Aug. 21, 1963, Ser. No. 303,618
10 Claims. (Cl. 137—625.4)

This invention relates to selector valve for fluid circuits and particularly to that class of valve which is adapted to connect one line selectively to either one of two lines.

For purposes of illustration, this invention will be described with reference to its application to fuel systems for heavy duty automotive vehicles such as trucks, cranes, hoists, and road-working equipment.

To insure against unexpected stoppages in the operation of heavy, expensive vehicles such as trucks, cranes, tractors, and the like, because of a failure of the fuel supply thereto, it is customary to furnish such equipment with two or more fuel tanks, with valve means for changing from an empty tank to a full tank to keep the equipment in operation. The valve means used to switch from one tank to another is generally referred to as a selector valve and may take various forms, depending chiefly upon the means used to operate it. It is desirable, however, that the valve itself be of a universal nature, so that it can be used with any type of operating means, whether it be direct manual, remote controlled manual as by a Bowden wire, or remote electrical using a switch and solenoid. It is also desirable that the valve operating mechanism be independent of the angular location of the mounting means relative to the axis of the valve. This universality as to means of operation and angular location of mounting means is desirable so that the same valve can be used in the greatest number of vehicles thereby enabling the manufacturer to increase his sales volume and effect economies in the cost of the valve.

It is accordingly an object of this invention to provide a selector valve which is universal as to the systems in which it can be applied and as to location on any given vehicle in which it can satisfactorily function.

Another object of this invention is the provision of a selector valve which is reliable in its intended functions of closing one line while opening another to a common outlet.

This invention also has within its purview the provision of a selector valve for a fuel line or the like, which valve is simple in construction; whose operating member is rotatable to any angle relative to the general axis of the valve; and in which the valve element, though movable in opposite directions to engage either one of two seats, is nevertheless held on either of its seats by preloaded springs.

These and other objects of this invention will become apparent from the following detailed description when taken together with the accompanying drawings in which FIG. 1 is a longitudinal section through a preferred embodiment of the valve, the section being taken substantially through the axis of the valve element thereof;

FIG. 2 is a an end elevational view, partly in section of the valve of FIG. 1, the valve element and its control being turned 90° from the position in which it is shown in FIG 1;

FIG. 3 is a plan view of the valve of FIG. 1; and

FIG. 4 is a fragmentary elevation in section of the valve of FIG. 2, taken along line 4—4 of FIG. 2.

Referring now to the drawings for a detailed description of the preferred embodiment of the invention disclosed therein for illustrative purpose, the valve is comprised of a valve body 10, which is shown as comprised of a section of bar stock. A through bore 11 is drilled in valve body 10, and two intersecting transverse bores, 12 and 13, are drilled in the side of valve body 10 to provide external communication with through bore 11. Between transverse bores 12 and 13 is formed a counterbore 14, the radially disposed surfaces 15 and 16 of which form valve seats for a valve element hereinafter to be described in detail. Intersecting counterbore 14 is a third transverse bore 17. All three transverse bores 12, 13 and 17, are threaded to receive the ends of pipes, or the threaded ends of appropriate fittings as the case may be, so that said valve body 10 may be connected into a fluid conducting system.

For purposes of illustration, transverse bores 12, 13 and 17 are shown as having their axes in substantially the same plane. It is apparent, however, that these transverse bores may be disposed, each in a different radial plane passing through the axis of through bore 11, and in fact, may have their axes inclined to the axis of through bore 11, if desired.

Within through bore 11, and preferably disposed concentrically therewith, is a valve element 18, which is formed with a centrally located land 19, the outer surface 20 of which is substantially the same diameter as the diameter of through bore 11, so that said land may move axially in through bore 11 with a sliding fit. In said outer surface 20 is formed a semicircular groove 21, in which is disposed a ring of packing 22, preferably made of a resilient deformable material, such as rubber, either synthetic or natural, or combination of the two, and having a circular radial cross-section. Such packing rings are commonly referred to as O rings. The packing ring 22 is normally of a slightly smaller internal diameter than the external diameter of the bottom of the groove 21, so that the ring is in a stretched condition when it is installed in groove 21.

A second land 23 is formed on valve element 18 and is located thereon above transverse opening 12 as seen in FIG. 1, so that a relatively wide peripheral groove 24 is formed between lands 19 and 23 which is in communication with transverse bore 12. Land 23 serves to locate valve element 18 in bore 11 and also serves to retain a packaging ring 25 in a peripheral groove 26 formed for this purpose in land 23. Said packing ring 25 may likewise be formed from resilient deformable material, such as rubber, either synthetic or natural, or a combination of the two, and may also be circular in radial cross-section to have the well-known O ring form. Below land 19, valve element 18 is reduced in diameter to terminate in a pin 26, the lower end of which as shown in FIG. 1, is received with a sliding fit in a recess 27 formed in a plug 28 threadedly received in the end 29 of through bore 11. A ring of packing 30 forms a seal between plug 28 and valve body 10. The space 31 between the end of pin 26 and the bottom of recess 27 is vented through a passage 32 in pin 26 connecting the lower end of the pin with the exterior thereof in the space between plug 28 and land 19.

It may be noted that the space around pin 26 between plug 28 and land 19 is in communication with transverse bore 13. It may be observed further from the relationship of the parts thus far described that O ring 22 extends radially outwardly beyond the surface 20 of land 19, and since land 19 is of an outside diameter substantially equal to the internal diameter of bore 11, said O ring 22 necessarily extends into counterbore 14. Thus, if valve element 18 is moved downwardly in bore 11, as viewed in FIG. 1, the protruding portion of O ring 22 will overlie and rest upon the radially disposed surface 16 of counterbore 14, thereby compressing said O ring, first, against said surface 16 and secondly, against the upper portion of groove 21 in land 19, so that a fluid-tight seal may be effected between valve body 10 and valve element 18 through O ring 22, if sufficient pressure is impressed thereon in an axial direction. Similarly, if valve element 18 is moved upwardly in counterbore 11, as viewed in FIG. 1, until O ring strikes radially disposed surface 15 of counterbore 14, said O ring will form a fluid-tight seal between said surface 15 and valve element 18.

When O ring 22 is in sealing engagement with surface 16, the relative axial lengths of outer surface 20 of land 19 and of counterbore 14 are such that counterbore 14 is in communication with wide peripheral groove 24 and with transverse bore 17. Similarly, when valve element 18 is shifted so that O ring 22 is in sealing engagement with radially disposed surface 15 of counterbore 14, the space in through bore 11 around pin 26 is in communication with transverse bores 13 and 17. Thus, by appropriately shifting valve element 18 axially in its through bore 11, the transverse bore 17 may be connected selectively either to transverse bore 12 or to transverse bore 13, while at the same time sealing off the opposite transverse bore. If, for example, transverse bore 12 is connected to one fuel tank, transverse bore 13 is connected to another fuel tank, and transverse bore 17 is connected to the fuel intake system for an internal combustion engine, said fuel intake system can be connected selectively to either of the tanks merely by shifting valve element 18 axially in counterbore 11.

It is contemplated that O ring packing 22 will be held against radially disposed walls 15 or 16 by spring pressure, so that once the valve is shifted, no external force is needed to hold it in its shifted position. This insures a steady, adequate pressure on the O ring packing 22 to establish the necessary seal between valve body 10 and the valve element 18. The means by which such spring pressure is provided will now be described.

The upper end of through bore 11, as viewed in FIGS. 1 and 2, is counterbored as at 33. Within counterbore 33 is a loosely fitting washer 34, which is made of relatively heavy gauge material so as to be rigid under the forces which will be imposed upon it by the springs and control elements hereinafter to be described. Said washer 34 is held in counterbore 33 by a snap ring 35, and is chamfered at 36 to allow greater axial movement of said washer in counterbore 33 without unduly lengthening said counterbore. A wave type of spring 37 is interposed between washer 34 and the radially extending wall 38 defining the inner end of counterbore 33, said wave spring having a maximum free axial dimension which is greater than the maximum axial dimension of the space between washer 34 and wall 38, so that said spring is normally in compression at all times and is prevented from rattling when the valve body 10 is vibrated by an associated engine-supporting frame. A recess 39 is formed in the upper central region of valve element 18 in which is retained a helical spring 40. Washer 34 extends across opening 39, and spring 40 has a free height which is greater than the maximum distance between washer 34 and the bottom of recess 39, so that said spring 40 is in compression in its recess and normally tends to urge valve element 18 downwardly as viewed in FIG. 1, to the position shown in that figure. In such position O ring 22 abuts upon radially disposed surface 16 and forms a seal therewith, thus blocking any communication between transverse bores 13 and 17. In this position, as previously explained, communication is established between transverse bores 12 and 17.

It may be noted that in the position shown in FIG. 1, O ring 22 is held against surface 16 by the resilient action of spring 40. The means for holding O ring 22 against surface 15 in a resilient manner will now be described.

Valve element 18 extends upwardly, as viewed in FIG. 1, from land 23 beyond the upper end of valve body 10, said upper extension being axially slotted to form a pair of parallel ears, 41 and 42 (FIG. 3). A valve operating lever 43 is inserted between ears 41 and 42 and is pivotally secured thereon by a pin 44 extending through said ears 41 and 42 and said lever 43. A cam 45 is formed on lever 43 and on the side thereof disposed between pin 44 and washer 34, said cam comprising a flat surface 46 which, as shown in FIG. 2, may be brought to a position wherein its plane is normal to a radius from the center of pin 44. Said cam also has a rounded surface 47 which, when lever 43 is turned so that surface 46 is normal to the axis of valve element 18, is disposed to one side of said axis. Thus the distance between the center of pin 44 and washer 34 may be varied from a maximum distance X occurring when surface 46 is normal to the axis of valve 18 (FIG. 2) to a minimum distance Y occurring when lever 43 is turned about its pivot pin 44 and assumes the position shown approximately in FIG. 1. The difference in these axial distances is greater than the maximum axial movement of valve element 18 in through bore 11 permitted by the movement of O ring 22 between the radially disposed walls 15 and 16. The net result, therefore, as lever 43 is rotated from the position shown in FIG. 1 to the position shown in FIG. 2, is that during the first part of such movement, valve element 18 is raised in bore 11, as viewed in FIG. 1, from the position shown therein to the position at which O ring 22 abuts upon radially disposed surface 15. At this point, except for a slight compression of said O ring 22, valve element 18 cannot continue its vertical movement and accordingly, if lever 43 is to continue its rotation about pivot pin 44, washer 34 must be moved downwardly as viewed in FIGS. 1 and 2, against the action of wave spring 37. When the position of lever 43 shown in FIG. 2 is reached, that is, when surface 46 is normal to the axis of bore 11, washer 34 becomes a fixed abutment on valve element 18 buttressed by cam 45 and pin 44, so that said washer 34 is now a fixed part of valve element 18, and O ring 22 is then held against surface 15 by the resilient action of wave spring 37. In this manner, the desired objective of having O ring 22 held against surface 15 by resilient action is attained.

Washer 34 may take various forms, but in the one chosen to illustrate this invention, it is formed with appropriate openings 48 and 49, through which ears 41 and 42 project, said openings leaving in effect a bar 50 extending across the recess 39 and providing the abutment against which the upper end of spring 40 may bear.

The difference in the distances represented by the arrow ended lines X and Y may be made greater or lesser for a given angular movement of lever 43 by changing the shape of the central regions of the bar 50 relative to the normal plane of washer 34. Thus, in the form shown in FIGS. 1 and 2, bar 50 has been bowed upwardly an appropriate amount to provide the desired difference in distances. The upper surface 51 of bar 50 over which the rounded surface 47 of cam 45 rides, may be made to have any desired contour to provide the desired rate of relative movement between lever 43 and washer 34.

It may be noted that rounded surface 47, when initially contacting bar 50 as shown in FIG. 1, is much closer to snap ring 35 at one side of bar 50 than at the other side, i.e., it is almost directly over wave spring 37 at the left hand side of bar 50 (FIG. 1) and is almost the entire length of bar 50 away from the diametrically opposite side of wave spring 37. The force exerted by wave spring 37 upon bar 50 is the same at both ends of bar 50; consequently, during the initial operation of cam 45, washer 35 fulcrums about snap ring 35 at the right hand side of bar 50 (FIG. 1) and the spring under the left hand side of bar 50 is depressed. To accommodate such tilting of washer 35 in counterbore 33, the diameter of said washer is appreciably smaller than the diameter of counterbore 30.

Although a predetermined force is required to be impressed upon lever 43 to change its position from that shown in FIG. 1 to that shown in FIG. 2, inasmuch as it is necessary first to compress spring 40 between bar 50 and the bottom of recess 39, and second, to compress wave spring 37 between washer 34 and valve body 10, the opposite is true in moving the lever in the opposite direction, so that once the dead center position shown in FIG. 2 is passed, the action of springs 37 and 40 is in a direction to provide components of force tending to assist the continued rotation of lever 43 from the position shown in FIG. 2 to that of Fig. 1. Upon attainment of either of the positions shown in FIGS. 1 and 2, however, no exterior force is required to hold the valve element 18 in these positions.

It is understood that cam 45 may be disposed at any desired angular location with respect to lever 43 so that said lever may, instead of extending to the right of the valve body as shown in FIG. 1, extend upwardly or may in fact extend to the left as shown in that figure. For any selected angular position of lever 43 about its pivot pin 44, said lever and its associated cam 45 may assume any angular position around the axis of bore 11. Thus, valve element 18 and the entire assembly between it and lever 43 may be rotated about the axis of bore 11 to any desired position, so that the particular location of the mounting means for housing 10 required by a given installation can be accommodated merely by rotating lever 43 about the axis of bore 11 to the point where the end of said lever may be reached by the mechanism by which the lever is to be operated. This means that for all installations valve body 10 and all of the elements associated therewith, with the exception of the lever 43, may be identical, and that by merely selecting the appropriate form of lever 43, said valve body 10 and its valve element, springs, etc. may be designed as a standard assembly.

Due to the fact that the outside diameter of O ring 22 is greater than the diameter of bore 11, it is necessary, in assembling the valve of this invention, first to insert said O ring 22 into counterbore 14, and then to insert valve element 18 into bore 11 from the upper end of valve body 10 as viewed in FIG. 1. It may be noted that a tapered surface 52 is provided between pin 26 and surface 20, so that downward movement of valve element 18 into O ring 22 tends first, to center said O ring relative to the valve element, and secondly, to expand it smoothly over surface 20 and into groove 21. Sail O ring 22 may be inserted into counterbore 14, through transverse bore 17 or alternatively, through bore 11.

Thus the selector valve hereinabove described provides maximum flexibility as to mounting and mode of operation with maximum reliability, the latter resulting from the spring loading of the valve element upon its seat in both of its operative positions.

It is understood that the foregoing description is merely illustrative of a preferred embodiment of the invention and that the scope of the invention therefore is not to be limited thereto, but is to be determined by the appended claims.

I claim:

1. A selector valve comprising a valve body having a longitudinal bore therein, axially spaced bores connected to the longitudinal bore, a transverse bore disposed between the axially spaced bores, a valve element axially movable in the longitudinal bore and adapted to connect the transverse bore selectively to one or the other of said axially spaced bores, axially spaced fixed abutments on the valve body, an axially movable abutment disposed between said fixed abutments, resilient means compressed between one of said fixed abutments and said movable abutment, axially spaced fixed abutments on the valve element, other resilient means compressed between a fixed abutment on the valve element and the movable abutment, and cam means interposed between and in contact with the other fixed abutment on the valve element and the movable abutment to shift the movable abutment relative to the fixed abutments on the valve element against the action of said other resilient means, whereby to shift the valve element in its longitudinal bore.

2. A selector valve as described in claim 1, said valve body having axially spaced valve seats in said bore in communication with said axially spaced bores, said valve element having radially disposed surfaces located between said seats and adapted upon axial movement of the valve element in said bore to contact one or the other of said seats.

3. A selector valve as described in claim 1, said valve body having axially spaced valve seats in said bore in communication with said axially spaced bores, said valve element having radially disposed surfaces located between said seats and adapted upon axial movement of the valve element in said bore to contact one or the other of said seats; said cam means having a dead center position relative to said movable abutment, the total movement of the movable abutment to its dead center position relative to the valve element being greater than the total movement of a radially disposed surface relative to its seat, whereby the valve element contacts its seat before the dead center position is reached, and said first mentioned resilient means is compressed by said movable abutment to hold said surface resiliently against its seat.

4. A selector valve as described in claim 1, said cam means comprising a lever pivoted about one of said fixed abutments on the valve element and having a cam surface on the end thereof, and a cam surface on the movable abutment contacted by the cam surface on the lever.

5. A selector valve as described in claim 1, said valve element having a bifurcated end, and said movable abutment comprising a washer having openings therein through which the bigfurcated end extends.

6. A selector valve as described in claim 1, said valve element having a bifurcated end, said movable abutment comprising a washer having openings therein through which the bifurcated end extends, and said cam means comprising a lever disposed between the bifurcations and pivoted on said valve element, said lever having a cam surface thereon adjacent the washer adapted to contact said washer.

7. A selector valve as described in claim 6, said washer having a cam surface adjacent the cam surface on the lever and cooperable therewith to determine the relative movement between the valve element and the lever.

8. A selector valve as described in claim 1, said axially spaced fixed abutments on the valve body comprising a shoulder and a snap ring, and said first mentioned resilient means comprising a wave spring bearing against said shoulder.

9. A selector valve as described in claim 6, said other resilient means extending between the bifurcations and contacting the portion of the washer extending therebetween.

10. A selector valve as described in claim 1, comprising additionally means interlocking said valve element and movable abutment against relative rotation with respect to one another, and said movable abutment being slidable relative to said first-mentioned resilient means, whereby said valve element and movable abutment are rotatable relative to said valve body.

References Cited by the Examiner

UNITED STATES PATENTS

| | | | |
|---|---|---|---|
| 2,616,658 | 11/1952 | Dumbreck | 137—625.5 |
| 2,971,090 | 2/1961 | Piet et al. | |
| 2,980,387 | 4/1961 | Devlin | 251—263 X |
| 3,068,890 | 12/1962 | Tamplen | 137—626.5 X |

M. CARY NELSON, *Primary Examiner.*